United States Patent [19]
Uchida

[11] Patent Number: 4,802,207
[45] Date of Patent: Jan. 31, 1989

[54] VOLTAGE-SENSITIVE TELEPHONE LINE MONITOR

[75] Inventor: Kazuyuki Uchida, Tokyo, Japan

[73] Assignee: Tandy Electronics Japan, Ltd., Tokyo, Japan

[21] Appl. No.: 109,578

[22] Filed: Oct. 16, 1987

[30] Foreign Application Priority Data

Oct. 17, 1986 [JP] Japan ................................ 61-245366

[51] Int. Cl.$^4$ ............................................. H04M 3/24
[52] U.S. Cl. .................................. 379/164; 379/350; 379/377
[58] Field of Search ................. 379/22, 164, 165, 350, 379/351, 352, 377

[56] References Cited

U.S. PATENT DOCUMENTS

| | | | |
|---|---|---|---|
| 4,446,338 | 5/1984 | Rosch | 379/164 |
| 4,456,791 | 6/1984 | Forestier | 379/377 |
| 4,674,117 | 6/1987 | Burns | 379/350 |

*Primary Examiner*—Stafford D. Schreyer
*Attorney, Agent, or Firm*—Wolf, Greenfield & Sacks

[57] ABSTRACT

Detector circuitry monitors the line voltage on a telephone line to detect an off-hook condition. In order to accomodate varying line voltages and noise conditions, the circuitry automatically selects a threshold off-hook voltage by an iterative initialization procedure which is initiated on circuit power-up. The intialization procedure repeatedly compares the threshold voltage to the actual line voltage over a period of time to eliminate false off-hook detection due to noise.

12 Claims, 3 Drawing Sheets

VOLTAGE-SENSITIVE TELEPHONE LINE MONITOR

FIELD OF THE INVENTION

The present invention relates to telephone line monitors, and, in particular, to telephone line monitors which detect line activity by checking line voltage.

BACKGROUND OF THE INVENTION

A telephone line monitor supervises a variety of conditions-such as an off-hook condition in which the telephone handset is lifted in preparation to placing a call, dial pulsing in which the telephone line is repeatedly shifted between the on-hook and off-hook conditions by the telephone dial mechanism, and "tapping" in which the hook switch is momentarily depressed by the user in order to signal the telephone switching machine.

All of the aforementioned conditions are characterized by changes in condition of the telephone line from an "on-hook" condition to an "off-hook" condition. Once these changes are detected, conventional telephone circuitry can distinguish between an off hook condition, dial pulses and tapping by determining the duration and pattern of the changes. The results are then used to obtain a variety of information. For example, by monitoring the generation of dial pulses, it is possible to record called numbers, call dates and times.

The change between the on-hook and off-hook condition is generated at the telephone handset. During normal operation the switching circuitry to which the handset is connected places a voltage on each telephone line. When the handset is "on-hook" it appears as a high-impedance across the telephone line, and accordingly, the switching circuit voltage appears across the telephone line as the "on hook" voltage.

When a telephone line goes "off-hook" it places a low impedance across the telephone line. This low impedance reduces the on-hook line voltage to a lower "off-hook" voltage value and also allows a significant increase in the line current.

Conventional telephone line monitors generally detect the change of current in the telephone line between the on and off hook conditions because this change of current can be reliably detected regardless of the actual line voltage. Accordingly, such telephone line monitors must be connected in series between the telephone line and the telephone set. A conventional connection is shown in FIG. 5 in which line monitors 3 are connected in series with line 1 and telephone sets 2.

This required series connection is inconvenient in a key telephone or PBX system such as shown in FIG. 5 in which PBX 5 has a line, 1, to which several telephones 2 are connected by means of plugs and jacks shown schematically as outlines 4. In such a system conventional telephone line monitors 3 must be connected in series with each of telephone sets 2 as shown in FIG. 5. Thus, the number of telephone line monitors required equals the number of telephones in the system, even if the number of telephone lines is much lower.

Further, in a modern telepone system which uses plugs and jacks, the series connection is difficult to retrofit to existing systems. Since the conventional monitor must be inserted into each line, in an existing system the monitor must be placed at each jack location. For example, a typical connection would involve inserting a plug of the telephone line monitor into the wall jack and then inserting the telephone set plug into a jack provided on the telephone line monitor. While this connection is relatively simple, it requires placing the line monitor circuitry at or near the actual location of the telephone and, thus, leaves the monitor circuitry exposed to the user where it is likely to be damaged or tampered with. In addition, since the line monitors are remotely located at each tel phone position, there is generally no easy way to forward the detected signals back to the PBX or central location.

In order to avoid the problems inherent in the above mentioned conventional current-responsive line monitors, it is convenient to monitor on-hook/off-hook conditions by detecting the change of line voltage which, as mentioned previously, occurs when the telephone set goes off-hook. Since a line voltage detector monitors changes in the line voltage rather than the current flowing to each telephone set, a single monitor can detect on-hook/off-hook conditions on a given line no matter how many telephones are connected to the line.

For example, a telephone line monitor which detects changes in line voltage can be connected in a conventional PBX systems in a manner as shown in FIG. 6. FIG. 6 shows a PBX 5 with a telephone line 1 which is connected to a plurality of telephones 2 by means of jacks 4. In this system, voltage-sensitive line monitor 6 can be retrofitted to line 1 by simply plugging it into any jack 4 which is connected to the line 1. This jack may be located at or near PBX 5, and, thus, monitor circuitry 6 can be easily protected from user tampering and transfer of the detected signals can be accomplished by directly wiring the unit 6 to the PBX 5. Further, a single line monitor 6 can monitor all data such as off-hooks, dial pulses and tapping related to all telephone sets 2 connected to the lines 1. Consequently, the number of line monitors required in the system is equal to the number of lines rather than the number of telephones.

Despite the above-mentioned advantages, however, voltage-sensitive line monitors have generally not been used due to severe problems encountered in normal telephone systems. More particularly, the normal on-hook voltage in a telephone system depends upon the type of private branch exchange and the number of telephone sets connected to each telephone line and may vary over a wide range from line to line even within the same system. For example, a typical on-hook voltage may vary over a range from 12 to 105 volts. Thus, a voltage sensitive line monitor must be able to adapt to a large variation in voltage or several different models of monitors must be available to cover the voltage range.

Further, a voltage-sensitive line monitor detects an off hook condition be comparing the line voltage to an off hook threshold voltage. If the line voltage is below the threshold the telephone is deemed to be off-hook. If the line voltage is above the threshold the telephone is deemed to be on-hook. If the off-hook threshold voltage is preset to a fixed value during manufacture of the line monitor unit, it is not possible to reliably detect the off-hook due to the large variation in the line voltage from system to system. Even if the threshold is adjustable and is adjusted by the telephone system personnel at the time of installation, the line voltage on a particular line may change sufficiently with the connection of another telephone set to that line so as to require a readjustment of the threshold voltage.

Another problem with voltage-sensitive line monitors is that they are susceptible to interference by line noise.

Such noise may occur due to power lines which are routed close to the telepone lines or other sources or may be due to nearby electrical equipment. The noise may cause instantaneous variations in the line voltage which are sufficent to cause improper operation of the line monitor if the off-hook threshold voltage is not set sufficiently low enough to accomodate such variations.

Accordingly, an object of the present invention is to provide a telephone line monitor which can detect on hook/off hook changes by monitoring telephone line voltage.

It is another object of the present invention to provide a voltage sensitive telephone line monitor that is capable of reliably detecting an off hook condition in telephone systems in which the line voltage varies over a wide range.

It is still another object of the present invention to provide a voltage sensitive telephone line monitor that is capable of reliably detecting an off-hook condition in telephone systems in which the line voltage may vary significantly due to noise.

It is a further object of the present invention to provide a voltage-sensitive telephone line monitor that does not require manual adjustment of the off-hook threshold voltage, either at the time of installation or thereafter.

It is a yet another object of the present invention to provide a voltage-sensitive telephone line monitor that can be easily retrofitted to existing telephone systems, including those which use plug and jack technology.

It is a still another object of the present invention to provide a voltage-sensitive telephone line monitor that allows each telephone line to be monitored with a single line monitor even tough a plurality of telephones may be connected to the line.

SUMMARY OF THE INVENTION

The foregoing problems are solved and the foregoing objects are achieved in one illustrative embodiment of the invention in which a voltage-sensitive line monitor internally generates a variable off-hook threshold voltage based on actual telephone line conditions.

More particularly, the line monitor circuitry automatically selects a off-hook threshold voltage by an iterative initialization procedure which is initiated on circuit power-up. The initialization procedure computes a trial value of the off-hook threshold voltage from the actual line voltage and repeatedly compares the trial value to the actual line voltage over a period of time to eliminate false off-hook detection due to noise.

Specifically, the off-hook threshold voltage is determined by reducing the value of the on-hook line voltage by a predetermined amount. In order to determine the on-hook line voltage, an internal reference voltage is set at a maximum value and successively reduced. The internal reference voltage is compared at each successive value to the actual on-hook telephone line voltage. When the internal reference voltage equal the actual voltage during one of the successive steps, the reference voltage is selected as the initial on hook voltage. Determination of the initial on-hook voltage may be repeated to eliminate interference by noise on the telephone line.

The line monitor circuitry then computes an off-hook threshold voltage from the initial on-hook voltage by reducing the on hook voltage by a predetermined amount.

In order to verify that the computed off-hook threshold voltage is correct, the computed value is repeatedly compared to the actual on-hook line voltage over a period of time. Since the on hook voltage will be subject to noise variations during the comparison period, the comparisons will insure that such noise variations are taken into account. If the comparisons indicate that the computed threshold is reliable, the computed value is used to initialize the circuit.

Alternatively, if during some comparisons, the computed value of the threshold voltage is greater than the actual on-hook value (indicating that a false off-hook detection would occur if the circuit was in actual operation) the computed value is reduced and the comparison are repeated until a reliable value is ascertained.

DETAILED DESCRIPTION OF THE PREFERRED EMBODIMENT

Figure 1:
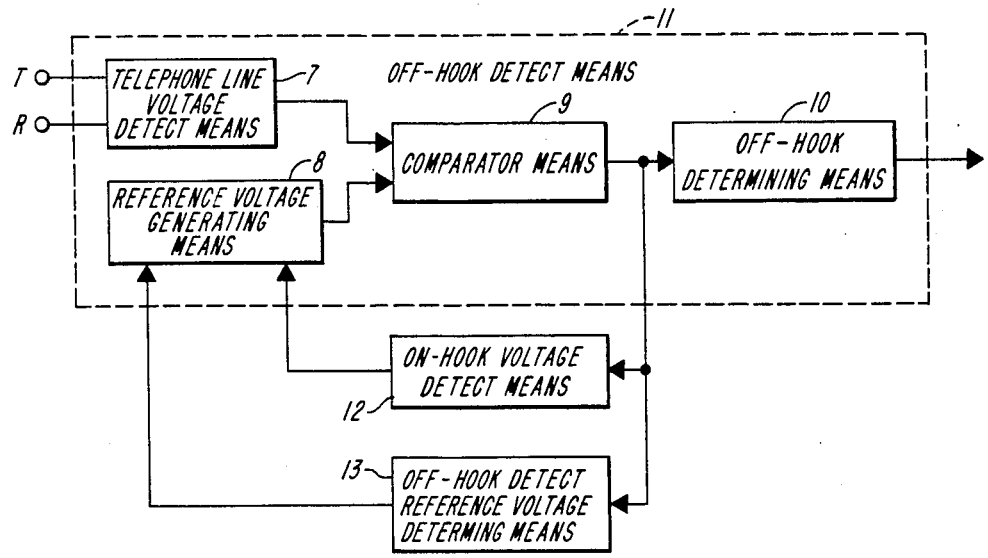
FIG. 1 is a block schematic diagram which illustrates the major functional blocks of one embodiment of the present invention.

FIG. 1 is a functional block diagram which illustrates the general construction of the present invention. The line monitor circuit is illustrated by the dotted box 11 and comprises a line voltage detector/converter circuit 7 a reference voltage qenerator 8, a comparator 9, an output circuit 10, an initial on-hook voltage qenerator circuit 12 and an off-hook threshold voltage generator 13.

The detector/converter 7 is a conventional circuit which detects the D.C. telephone line voltage appearing across the tip (T) and ring (R) leads of line 1 and reduces the line voltage to a lower voltage signal which is proportional to the line voltage but of a magnitude suitable for operation with the remainder of the circuitry. Circuit 8 may be any conventional variable reference voltage generating circuit which generates a variable reference voltage output under control of an external signal.

Comparator 9 compares the converted telephone line voltage with the reference voltage generated by source 8 and the output of comparator 9 drives an output circuit 10 which generates a suitable signal when an off-hook condition is detected on line 1 by circuit 11.

Due to the large variations in line voltage, as described above, it is necessary, first, for the circuit 11 to determine internally an initial on hook voltage that is representative of the line voltage in the absence of superimposed noise, thus taking into account the variations due to the switching system used and the number of telephones connected on the particular line. For this purpose, the initial on-hook voltage generator 12 operates in conjunction with comparator 9 and reference voltage generator 8.

More particularly, during the initial operation of the telephone line monitor when power is first applied or the system is reset, initial on-hook voltage generator 12 generates a signal which commands reference voltage generator 8 to generate a reference voltage output of maximum magnitude and to sequentially reduce this maximum value by predetermined decrements.

During the intialization procedure, telephone line 1 will be in an on hook condition, and comparator 9 will be provided with the converted on hook voltage generated by detector/convertor 7 and with the decreasing reference voltage generated by reference source 8. The output of comparator 9 is forwarded to the initial on-hook voltage generator 12. Although the output of comparator 9 is also forwarded to output circuit 10 and off-hook threshold voltage generator 13, these latter circuits are disabled by circuit 12 and, thus, do not respond.

Initial on-hook voltage generator continues to command reference voltage generator 8 to reduce the reference voltage until comparator 9 indicates that the reference voltage matches the on-hook line voltage. At this point, the value of the reference voltage is deemed to be the initial on-hook voltage value. However, in order to be sure that this initial value has not been erroneously affected by noise, circuit 12 may repeat the above-described operation of determining the initial on-hook voltage a plurality of times (preferably at least two times). The resulting values are compared and deemed to be the initial on-hook voltage only when the initial on hook voltages determined in each successive determination match.

After an initial on-hook voltage is determined, the determination of the off-hook threshold voltage commences. In particular, circuit 12 enables off-hook threshold voltage generator 13 and forwards to it the initial on-hook voltage. Thereupon, generator 13 uses the initial on-hook voltage to calculate a trial off-hook threshold voltage that is less than the initial on hook voltage by a predetermined value. This calculation is performed by using empirical coefficients which produce a predetermined ratio of the off-hook voltage to the on-hook voltage.

Off-hook threshold generator 13 then commands reference voltage source 8 to generate a reference voltage with a magnitude equal to the calculated trial threshold voltage. Thus, comparator 9 compares the actual on-hook line voltage with the trial off-hook threshold voltage.

Off-hook threshold generator 13 then repeatedly monitors the output of comparator 9 over a predetermined period of time to verify that the trial off-hook threshold voltage is always less than the actual telephone on-hook voltage. If the comparisons indicate that the trial off-hook voltage is always less than the on-hook line voltage, the trial off-hook threshold is deemed as the actual off-hook reference voltage and stored for later use during actual operation of the circuit.

However, if during one comparison, the trial off-hook threshold voltage is greater than the actual line voltage, the trial threshold voltage cannot be used, since at least some errors would result. In this event, a new trial voltage is calculated from the old trial voltage by reducing the old trial voltage a predetermined amount. The comparisons of the off-hook threshold voltage against the line voltage are then repeated until a suitable threshold value is determined.

To prevent a situation where the initial on-hook voltage was incorrectly determined from preventing a correct determination of the off-hook threshold voltage, a built-in reset mechanism is used. More particularly, if a valid off-hook threshold voltage cannot be determined (as indicated by the comparison operations) after the trial off-hook threshold has been reduced (and the comparison operations have been repeated) a predetermined number of times, off-hook threshold voltage generator 13 deems that the inital on-hook voltage was incorrectly determined and restarts trial on-hook voltage generator 12. Generator 12 then computes a new initial on hook voltage to begin the computation cycle again.

After a trial off-hook threshold voltage has been verified by the comparison operation, off-hook threshold voltage generator 13 sets the output of reference voltage generator 8 to the verified trial voltage and enables output circuit 10. The initialization operation is thereby finished and ordinary line monitoring is started. During this latter operation, when the telephone line voltage is smaller than the internal off-hook threshold voltage, comparator 9 will signal output circuit 10 to produce an off-hook signal which is used as data in the remainder of the circuit in a conventional fashion.

Since the internal off-hook threshold voltage is based upon the value of actual on-hook voltage present at the line monitor as described above, it always assumes a value that is correct for the actual telephone lines irrespective of the type of private branch exchange and the number of telephone sets connected to the line. Further, since the off-hook threshold voltage has been verified to be less than the actual on-hook line voltage even with superimposed noise, the inventive line monitor is reliable in the presence of such noise.

Moreover, since the same circuit components in the off-hook detector circuit 11 are utilized not only during the determination of the trial off-hook threshold voltage, but also during normal line monitoring operation, duplicate circuitry is avoided, thereby decreasing the cost and increasing reliability to a great degree.

Figure 2:
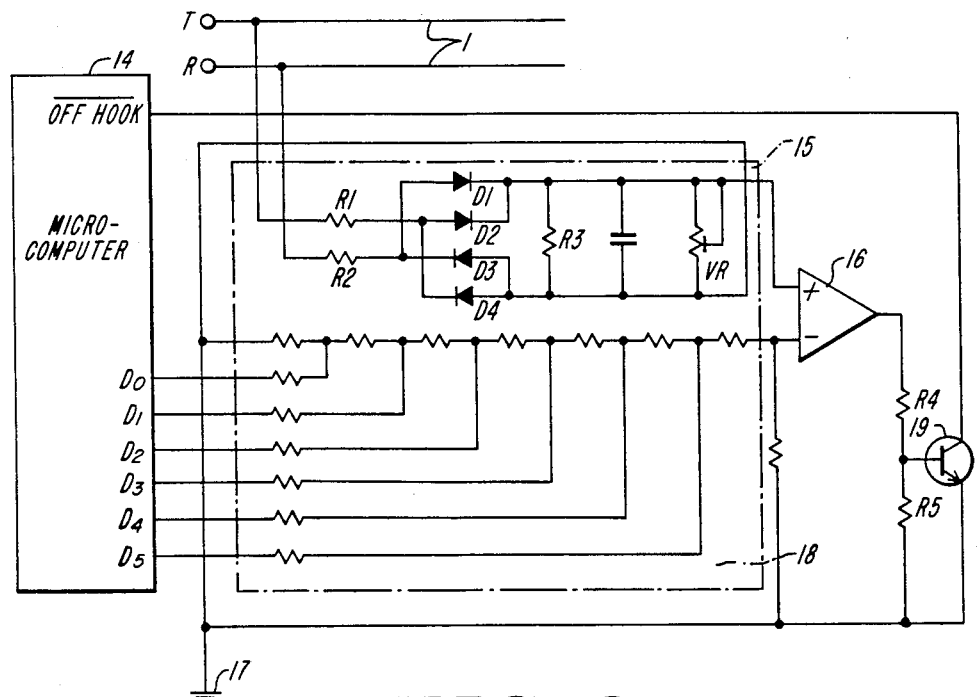
FIG. 2 is a more detailed circuit diagram illustrating one illustrative embodiment of the present invention.

FIG. 2 illustrates in more detail an embodiment of the present invention wherein a microcomputer 14 is used perform the functions of the inital on-hook voltage generator 12 and the off-hook threshold generator 13 (both shown in FIG. 1). As in FIG. 1, reference numeral 1 denotes the telephone line having a tip (T) and a ring (R) lead. Line voltage detector/convertor circuit 7 is a conventional high-impedance bridge type detector circuit wherein the line voltage between the tip and ring leads of telephone line 1 is first forwarded through resistors R1 and R2 and full-wave rectified through the diode bridge consisting of diodes D1 to D4. The rectified voltage is then divided by the resistive bridge consisting of resistors R1–R3 and a potentiometer VR to produce a converted output voltage. During manufacture of the circuit, potentiometer VR is adjusted so that the output of the circuit 7 is compatible with the input voltages required by comparator 9. One of the output terminals of circuit 7 is connected to the non-inverted input terminal of comparator 9 and the other output terminal is connected to circuit ground 17. Capacitor C is connected across potientiometer VR to absorb electrical noise.

The inverting input of comparator 9 is connected to the analog voltage output of a reference voltage generator 8. Generator 8 is comprised of a conventional ladder type digital-to-analog converter which is driven by digital signals produced on the output terminals $D_0$ to $D_5$ of microcomputer 14. D/A converter 8 operates in a conventional fashion and will not be described in detail. Since microcomputer 14 has six output terminals, it can control D/A converter 8 to generate $2^6$ or sixty-four discrete analog voltage steps, the analog voltages being developed across resistor R6 with respect to ground 17.

Figure 3:
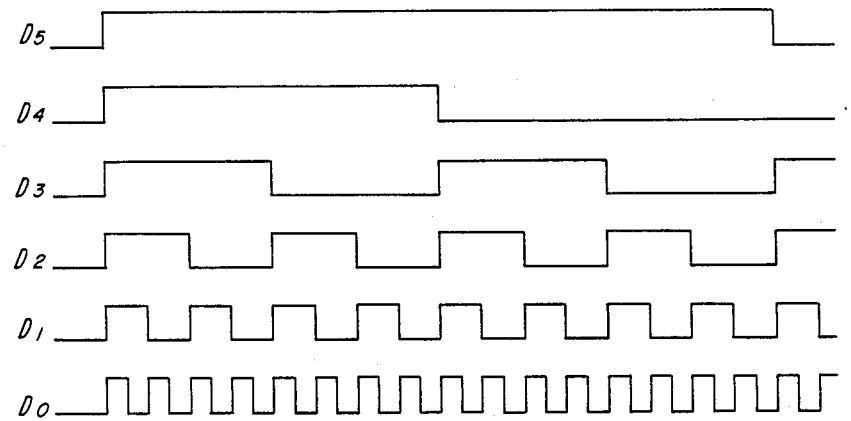
FIG. 3 is a diagram of output signals generated by the microcomputer control shown in the embodiment of FIG. 2.
Figure 5:
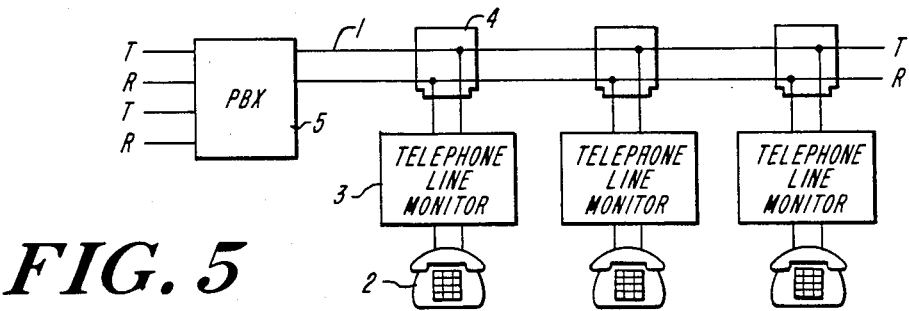
FIG. 5 is a schematic diagram showing the connection of conventional current-responsive telephone line monitors in a PBX system.
Figure 6:
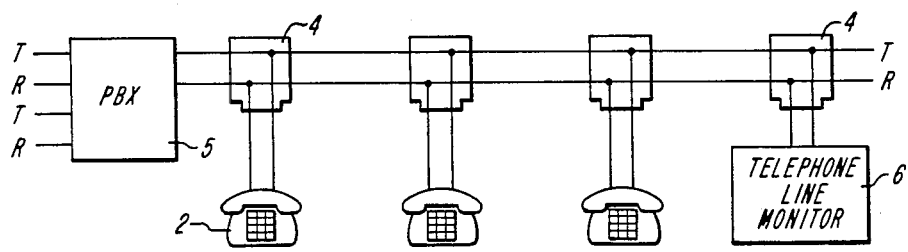
FIG. 6 is a schematic diagram showing the connection of a voltage-responsive telephone line monitor in a PBX system.

FIG. 3 shows approximately one-half of output signals which can be produced at the output terminals $D_0$ to $D_5$ of microcomputer 14. As shown in FIG. 3 these signals are related in the conventional binary way.

The output of the comparator 9 is provided to output circuit 10. Circuit 10 consists of resistors R4 and R5 and transistor 19. Resistors R4 and R5 divide the output voltage generated by comparator 9 and transistor 19 inverts the resulting signal. The output of transistor 19 is provided to an input terminal OFF-HOOK* (the "*" indicates that the signal is active in the "low" state) of the microcomputer 14. Microcomputer 14 monitors the OFF-HOOK* terminal to detect when an off hook condition has been detected.

The operation of the embodiment shown in FIG. 2 is controlled and coordinated by microcomputer 14. Microcomputer 14 can be any conventional microcomputer operating in conjunction with a stored program. The operation of microcomputer 14 and the associated FIG. 2 circuitry will be described in conjunction with a flow chart of FIG. 4 which describes the functions carried out by the program stored in computer 14. The actual program code which must be stored in computer 14 to perform the functions set forth in FIG. 4 is a matter of straiqhtforward proqraaming and is omitted herein for clarity.

Figure 4:
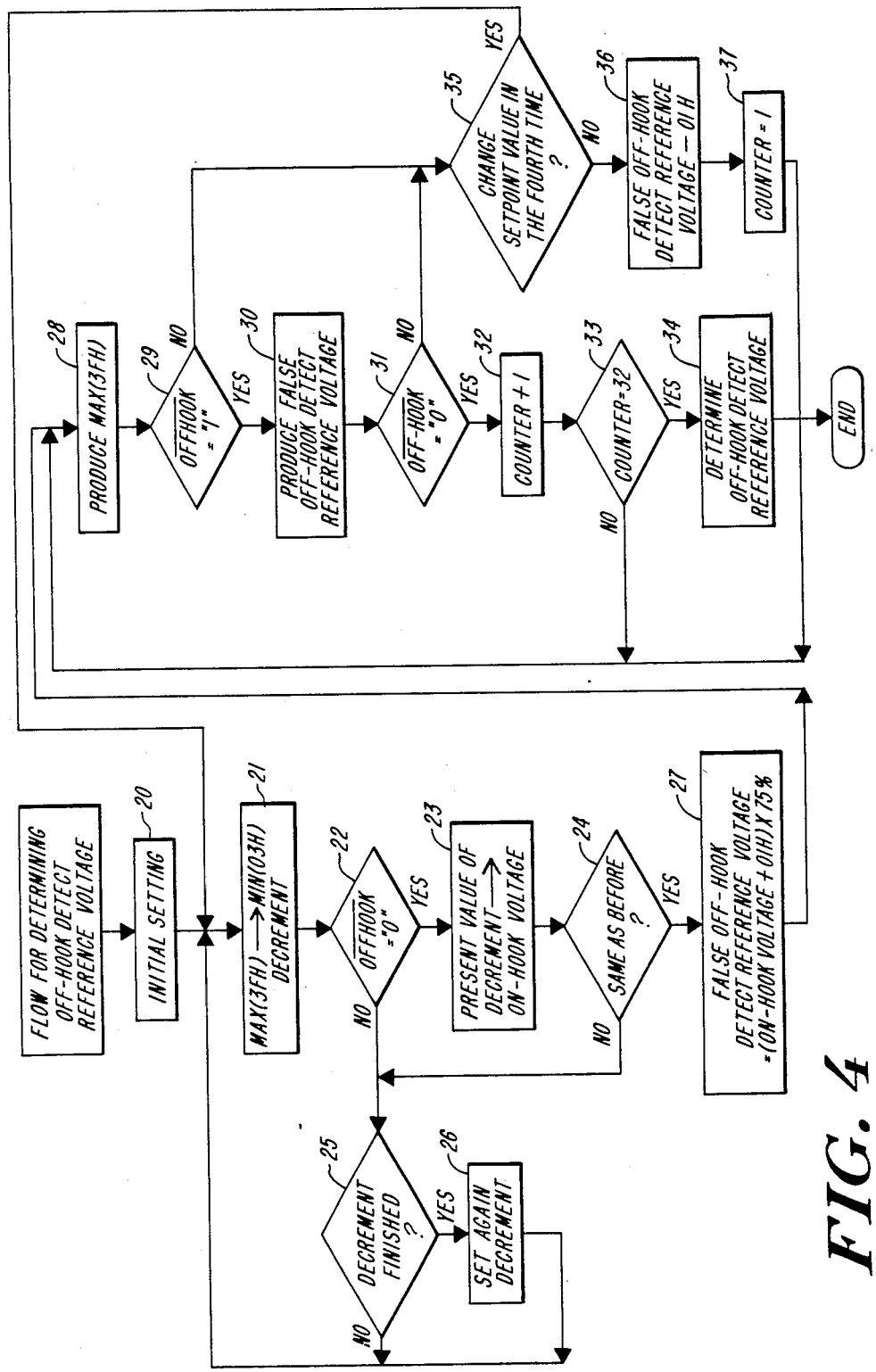
FIG. 4 is a flow chart illustrating computer program operation for determining an off-hook threshold voltage according to the embodiment shown in FIG. 2.

During initial power-up or during a system reset operation, the off-hook threshold voltage is determined in a manner as set forth in the description of FIG. 1 by executing the functional sequence illustrated in FIG. 4 More specifically, at step 20 microcomputer 14 is initialized. The initialization is performed in a conventional fashion and results in microcomputer 14 setting its output signals $D_0$ to $D_5$ so that the binary value of the signals is maximum (corresponding to 3F hex).

In step 21, microcomputer 14 adjusts output signals $D_0$ to $D_5$ so that their digital value is decremented by one. The program then proceeds to step 22 in which the output of comparator 9 as forwarded, via transistor 19, to computer 14 is checked. As previously mentioned, comparator 9 compares the output of line voltage detector/converter circuit 7 (with the telephone set in its on-hook condition) with the output of D/A converter 8 which is, in turn, controlled by computer 14. As long as the on-hook line voltage is smaller than the reference voltage the output of the comparator 9 assumes a "low" level which is inverted by transistor 19 and applied as a "high" level to the OFF-HOOK* port of computer 14. In step 22, computer 14 checks the signal at the OFF-HOOK* port. If a "low" signal is present, the program proceeds to step 25.

At step 25 the program compares the binary value of the signal on output leads $D_0$–$D_5$ of computer 14 to a predetermined minimum value (03 hex). The comparison in step 25 is used to set a lower limit on the initial on-hook voltage determination. If this limit is exceeded, the program proceeds to step 26 and reinitializes the system to start again (the signal on leads $D_0$–$D_5$ is reset to 3F hex and the system proceeds to step 21 to begin decrementing the output signal on leads $D_0$–$D_5$) If the lower limit has not been exceeded the program proceeds back to step 21 to continue the decrementing loop.

During normal operation, the reference voltage generated by reference voltage generator 8 under control of computer 14 will eventually become less than the on-hook line voltage. When this happens, the output of the comparator 9 will assume a "high" level which is inverted and forwarded as a "low" signal to computer 14. This "low" signal will be detected in step 23, cuasing the program to proceed to step 24.

In step 24 microcomputer 14 stores digital values of the output terminals $D_0$–$D_5$ just previously determined by the decrementing procedure as a representation of the initial on hook voltage. Since it is difficult to properly determine the initial on-hook voltage by only one passage through the loop up to step 23, the loop is repeated at least twice. The repetition is caused by step 24 in which the value of the initial on-hook voltage just calculated is compared to a value calculated by a previous pass through the loop and stored. if the two values do not agree, the loop is repeated when the program proceeds to step 25 Repetition is continued until two successive values agree.

Once agreement of two successive values is obtained, the stored value is deemed to be the initial on-hook voltage and the program proceeds to step 27. In step 27, microcomputer 14 computes a trial value of the off hook threshold.

As previously mentioned this computation is performed by applying empirically determined coefficients to the value of the initial on hook voltage just determined. In the illustrative embodiment, the value of the trial off-hook threshold is calculated by adding to the digital signals (on leads $D_0$–$D_5$) representing the initial on-hook voltage the value 01 hex (depending on the values chosen for the resistors in D/A converter 8, this increase may result for example, in a 2 volt increase in the output reference voltage). In general, the increase corresponds to one step of decrement used during the determination of the inital on-hook voltage.

Microcomputer 14 then calculates 75% of the increased value and uses the resulting value as the digital value representing the trial off hook threshold voltage. This value is stored. However, in order for the trial off-hook threshold voltage to be verified as an actual off-hook threshold voltage and used in later operation, it is essential that the actual on hook line voltage be always greater than the off hook threshold even when the actual on-hook line voltage is decreased by the qreatest amount due to noise. For this purpose, the trial off-hook threshold voltage is verified through steps 28 to 33.

In step 28, the comparison circuitry is first checked. In order to do this, microcomputer 14 generates a maximum value (3F hex) on its output terminals $D_0$–$D_5$. In addition, a loop counter is reset to "1". The maximum value on outputs $D_0$–$D_5$ causes reference voltage generator 8 to generate a reference voltage with maximum value. Comparator 9 compares the actual on hook line voltage maximum reference voltage value. If the comparison circuitry is operating properly, the maximum reference value will always be greater than the actual on hook line voltage. Consequently, a "high" will be forwarded to the OFF-HOOK* port by transistor 19 and the program proceeds to step 30.

Alternatively, if an error in the operation of the comparison circuitry is indicated by the detection of a "low" signal at the OFF HOOK* port in step 29, then the program proceeds to step 35, which, as will be hereinafter described, results in the entire off-hook threshold procedure being restarted after a predetermined number of errors are detected.

Assuming that the comparison circuitry is operating properly, in step 30, microcomputer 14 generates at its output terminals $D_0$–$D_5$ signals representing the trial off-hook threshold voltage previously stored in step 23. Comparator 9 compares the actual on-hook line voltage as generated by detector/converter circuit 7 with the trial off-hook threshold voltage generated by reference voltage generator 8.

In step 31, microcomputer 14 checks the OFF-HOOK* port. If the trial off-hook threshold voltage is less than the actual on-hook voltage, a "low" signal appears at the OFF-HOOK* port. In this case, the program proceeds to step 32.

In step 32, the loop counter is incremented. In order to insure the reliability of the trial off-hook threshold, the aforementioned comparison operation is repeated a predetermined number of times. The value of the loop counter is compared to the predetermined number (in the illustrative embodiment this predetermined number is "32") to determine if the required number of comparisons have been made. If less than the required number of comparisons have been made the program proceeds back to step 28 to repeat the comparison process with a new value of the actual on hook line voltage obtained at a slightly later time.

If the required number of comparisons have been made and if the same result of the comparison is achieved in all comparisons, the trial off hook threshold voltage is deemed to be the actual off-hook threshold voltage and stored in step 34 and the program ends.

If the result of any comparison is that the trial off-hook threshold voltage is greater than the actual on hook voltage or, if an error is indicated in step 29 (as previously described), the program recalculates a new trial off-hook threshold value and proceeds to perform a new series of comparisons.

However, before recalculatinq the trial off hook threshold voltage, in step 35, the program checks to see how many previous recalculations have been performed. A limit is placed on the number of recalculations to prevent the program from entering an endless loop. In step 35, a recalculation counter is incremented and compared to a predetermined value (in the illustrative embodiment, the predetermined value is four). If the number of recalculations exceeds the predetermined number, the program proceeds back to step 21 where a new value of the initial on-hook voltage is determined.

Assuming that the number of recalculations is less than the predetermined value, the trial off-hook threshold is recalculated in step 36 by decreasing by 01 hex the digital signals on outputs $D_0$–$D_5$. In step 37, the loop counter is reset to "1" and the program proceeds to step 28 to perform the series of comparisons again.

The trial off-hook threshold voltage stored in step 34 is produced from the output terminals $D_0$–$D_5$ of microcomputer 14 so that the reference voltage generated by generator 8 and provided to comparator 9 is set to be the trial off-hook threshold voltage. This condition is held during the subsequent ordinary monitoring operation nd the determination of the off-hook threshold voltage as shown in FIG. 4 is not repeated until the initial operation is required by conditions such as power failure or system reset.

Although only one illustrative embodiment is shown, other modifications and changes will be immediately obvious to those skilled in the art. For example, the number of recalculations of the initial on hook voltage need not be limited to two as disclosed but may be three or more recalculations to improve accuracy.

Similarly, the method of calculating the trial off-hook threshold voltage in the step 27 has been found to be empirically good, but other methods may be substituted. Further, steps 28 and 29 as shown in FIG. 4 may be omitted.

In another embodiment, the number of comparisons of the trial off hook threshold voltage to the actual on hook voltage need not be limited to 32 times only, but may be suitably changed depending upon the noise conditions of the telephone line.

What is claimed is:

1. Telephone line monitor apparatus which detects an off-hook condition on a telephone line by monitoring the line voltage, said monitor apparatus comprising, means responsive to said line voltage for generating an off-hook threshold voltage based on at least one value of said line voltage, and means responsive to said off hook threshold voltage and to said line voltage for indicating an off hook condition when said line voltage is less than said off-hook threshold voltage.

2. Telephone line monitor apparatus according to claim 1 wherein said generating means generates said off hook threshold voltage based on at least two values of said line voltage sampled at two different times.

3. Telephone line monitor apparatus according to claim 1 wherein said generating means comprises means responsive to said line voltage for calculating a trial off-hook threshold voltage by means of a predetermined relation to said line voltage and means for verifying that said trial off-hook voltage is less than said line voltage.

4. Telephone line monitor apparatus according to claim 3 wherein said trial off hook threshold voltage is verified by comparing said trial off-hook threshold voltage to said line voltage.

5. Telephone line monitor apparatus according to claim 4 wherein said trial off-hook threshold voltage is verified by comparing said trial off-hook threshold voltage to a plurality of samples of said line voltage taken at different instants of time and verifying said trial off-hook threshold voltage only if said trial off-hook threshold voltage is less than said line voltage in each comparison.

6. Telephone line monitor apparatus according to claim 3 wherein said off hook threshold voltage generator means comprises means responsive to said line voltage at a given instant of time for calculating an initial on-hook line voltage value and said trial off-hook threshold voltage is calculated by means of a predetermined relation to said inital on-hook line voltage value.

7. Telephone line monitor apparatus according to claim 6 wherein said means for calculating said initial on-hook line voltage value comprises means for qenerating a variable reference voltage which progressively decreases in magnitude, means responsive to said line voltage for comparing said line voltage to said decreasing reference voltage and means for setting said initial on-hook line voltage value to said reference voltage value when said reference voltage value equals said line voltage value.

8. Telephone line monitor apparatus which detects an off-hook condition on a telephone line by monitoring the line voltage, said monitor apparatus comprising, means comprises means responsive to said line voltage at a given instant of time for calculating an in initial on hook line voltage value means responsive to said line voltage for calculating a trial off-hook threshold voltage by means of a predetermined relation to said initial on-hook line voltage line voltage means for verifying said trial off hook threshold voltage by comparing said trial off-hook threshold voltage to a plurality of samples of said line voltage taken at different instants of time and verifying said trial off-hook threshold voltage only if said trial off-hook threshold voltage is less than said line voltage in each comparison, and means responsive to said verified trial off-hook threshold voltage and to said line voltage for indicating an off-hook condition when said line voltage is less than said verified off hook threshold voltage.

9. Telephone line monitor apparatus according to claim 8 wherein said means for calculating said initial on-hook line voltage value comprises means for generating a variable reference voltage which progressively decreases in magnitude, means responsive to said line voltage for comparing said line voltage to said decreasing reference voltage and means for setting said initial on-hook line voltage value to said reference voltage value when said reference voltage value equals said line voltage value.

10. Telephone line monitor apparatus according to claim 9 wherein said means for calculating said initial on hook line voltage value calculates said initial on hook line voltage value at least twice using values of said line voltage taken at different instants of time and only uses initial on-hook line voltage value if the calculated values are equal.

11. Telephone line monitor apparatus according to claim 8 wherein said verifying means comprises means for recalculating said trial off-hook threshold voltage if said trial off-hook threshold voltage is not verified.

12. Telephone line monitor apparatus according to claim 11 wherein said verifying means further comprises means responsive to each recalculation of said trial off-hook threshold voltage for restarting said line monitor apparatus if the number of recalculations exceed a predetermined number.

* * * * *